Aug. 27, 1963 J. F. HUFF 3,101,631
PRECISION ADJUSTING HEAD FOR MACHINE TOOLS
Filed June 19, 1961 2 Sheets-Sheet 1

INVENTOR.
JOSEPH F. HUFF
BY *Kenway, Jenney & Hildreth*
ATTORNEY

Aug. 27, 1963   J. F. HUFF   3,101,631
PRECISION ADJUSTING HEAD FOR MACHINE TOOLS
Filed June 19, 1961   2 Sheets-Sheet 2

*INVENTOR.*
JOSEPH F. HUFF
BY *Kenway, Jenney & Hildreth*

ATTORNEYS

United States Patent Office 3,101,631
Patented Aug. 27, 1963

3,101,631
PRECISION ADJUSTING HEAD FOR MACHINE TOOLS
Joseph F. Huff, Hyde Park, Mass., assignor to Northrop Corporation, Beverly Hills, Calif., a corporation of California
Filed June 19, 1961, Ser. No. 118,059
3 Claims. (Cl. 77—58)

This invention relates to adjusting means for machine tools, and more particularly to an improved adjusting head for precisely positioning parts of machine tools, such as cutting tools, tool slides, and the like; and has as its primary object the provision of an improved adjusting head by means of which an operator may conveniently adjust the position of a machine tool part with great accuracy. It is a further object of the invention to provide an improved adjusting head which occasions a minimum of inaccuracy in the mechanical transmission of the movement of manual adjusting means to a part which is to be adjusted. Further objects and advantages of the invention will become apparent as the following description proceeds.

Briefly stated, according to a preferred embodiment thereof, my invention contemplates the provision of a body, generally cylindrical in form, which is adapted to be mounted on a machine tool, and may be stationarily or movably supported, depending upon the choice of another part of the machine tool which it is desired to adjust. The adjusting head finds particular utility as a boring tool support, and for this purpose may carry a conventional boring tool and be mounted on a spindle for rotation of the tool about the principal axis of the body at a radius which is manually adjustable through the facility of the adjusting head. However, the improved adjusting means is not limited to such a use, but may be stationarily mounted on a machine tool and utilized for adjusting the position of a stationary tool, a slide, or any other adjustable part.

The body includes a bifurcated portion formed by a rectilinear slideway whose walls lie in planes parallel to a plane passing diametrically through the principal axis of the body. A cam member, including a ring circumferentially spaced about the body, is provided with a pair of diametrically-opposed cam portions extending interiorly of the ring into slidable reception in the slideway. An adjustment barrel is circumferentially spaced about the body and threadedly engaged with the cam member. The barrel is mounted upon the body for rotation about the axis thereof, so as to move the cam member and its cam portions axially. Rotation of the cam member is prevented by the sliding engagement of the cam portions in the slideway.

A tool slide is slidably received in the slideway and interposed between the cam portions, and the body is provided with means which restrict the slide to rectilinear motion normal to the principal axis. The tool or other part to be adjusted is mounted in or drivingly connected, as desired, to the tool slide. The tool slide is further formed with cam surfaces drivingly engaged with confronting cam surfaces formed in the cam member, so that axial movement of the cam member brought about by rotation of the adjustment barrel produces an adjusting movement of the tool slide normal to the principal axis.

The cam surfaces of the cam member and the tool slide preferably comprise parallel planar surfaces which are normal to the diametral plane of the slideway and skew to the principal axis. In this instance, the tool slide forms a parallelogram in a cross-section lying in the diametral plane.

As a further feature of the invention, ball bearings may be interposed in compression between the cam surfaces of the tool slide and the cam member, and are retained in spaced relation by suitable retainers. Furthermore, ball bearings may be interposed in compressed relation circumferentially between the ring of the cam member and the arcuate cylindrical surfaces of the bifurcated portions of the body, and are spaced by suitable arcuate retainers. These means substantially eliminate play between the relatively-movable parts, and reduce frictional resistance to axial movement of the cam member.

While the specification concludes with claims particularly pointing out and distinctly claiming the subject matter which I regard as my invention, it is believed that the invention will be more clearly understood from the following description of a preferred embodiment thereof, referring to the accompanying drawings, in which:

Figure 1:
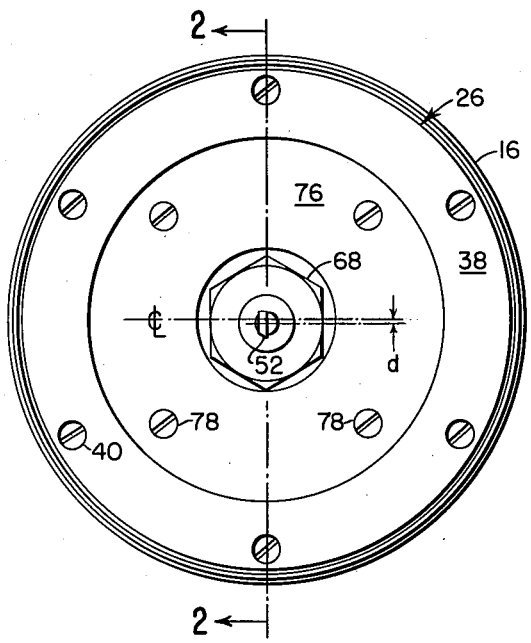
FIG. 1 is a view in end elevation of an adjustment head adapted for use as a boring tool support, according to the invention.

In the drawings, an embodiment of the improved adjustment head is shown which is adapted for use as a boring tool support, and comprises a body 10 which is generally cylindrical about a principal axis, and is formed with a threaded bore 12 for mounting on a machine tool spindle (not shown). The body is formed with diametrically opposed recesses 14 for convenience in tightening the body on the threaded spindle. An annular adjustment barrel 16 is circumferentially spaced about the body. A circumferential shoulder 18 formed about the body is received within an annular groove 20 in the barrel. A ring 22 is secured upon the barrel by means of screws 24 to secure the assembly snugly but not tightly, to prevent axial movement of the barrel 16 on the body 10.

A cam member, generally designated at 26, includes a cam-mounting ring 28 which is threadedly engaged at 30 in an annular flange 32 of the adjustment barrel, for axial movement in response to manual rotation of the barrel. The barrel is thus mounted for rotation about the body 10. The cam member further includes a pair of cam portions 34, which are clamped interiorly of the ring 28, against a circumferential flange 36 formed rearwardly herein, by means of a cam-retaining ring 38 secured upon the face of the ring 28 by a circumferential row of machine screws 40.

Figure 3:
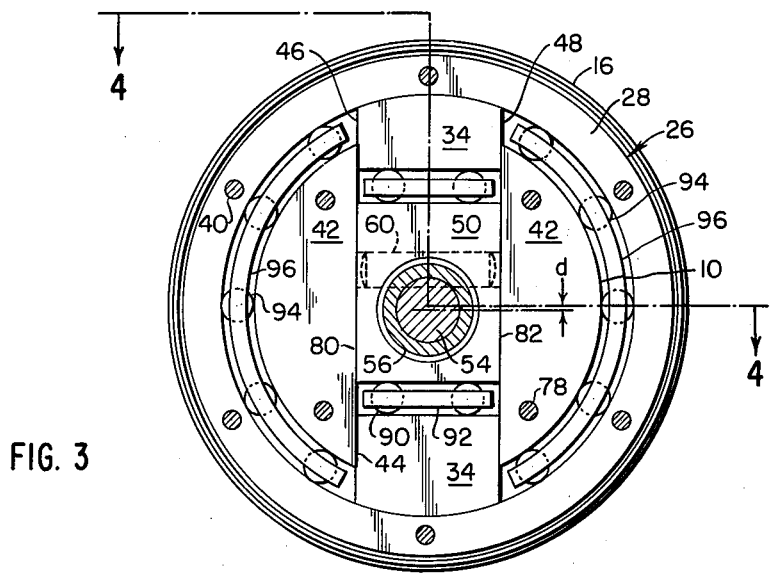
FIG. 3 is a cross-section in end elevation, taken along line 3—3 in FIG. 2, looking in the direction of the arrows.

The body 10 is provided with axially-extending bifurcated portions 42, formed by a rectilinear slideway 44 whose walls lie in planes parallel to a plane passing diametrically through the principal axis. The cam portions 34 are received in axially-slidable relation within the slideway, being formed with parallel planar surfaces 46 and 48 (FIG. 3) for this purpose. The cam portions thus restrain the cam member 26 against rotation with respect to the body 10 about the principal axis.

A tool slide 50 is also slidably received within the slideway 44, for driving connection with a tool or other part which is to be adjusted. In the embodiment shown, a cutting tool 52 is suitably fixed in a tool holder 54, which is slidably received within a cylindrical retainer 56 press-fitted into a cylindrical counterbored opening 58 formed along the axis in the tool slide. A pin 60 is press-fitted transversely in an opening 62 in the tool slide to permanently retain the sleeve 56 in position, and projects into the bore 58 to act as a stop against a taper 64 formed in the tool holder. The tool holder has a shoulder 66 for locking engagement with a nut 68 threaded on the tool holder at 70 to securely retain the tool in assembled relation in the tool slide.

The tool slide is restrained against axial movement with respect to the body by means of a pair of projections 74 at the rearward end of the slide, which are diametrically opposed with respect to the axis to reduced binding between the tool slide and the body; and by a slide retaining plate 76, which is received freely within the cam-retaining ring 38 and secured in radially-extending relation to the axis upon the end faces of the bifurcated portions 42 by means of screws 78. The tool slide is thus confined to movement normal to the principal axis, and has parallel planar faces 80 and 82 (FIG. 3) in sliding engagement with the walls of the slideway to prevent rotation of the slide in the body.

Figure 2:
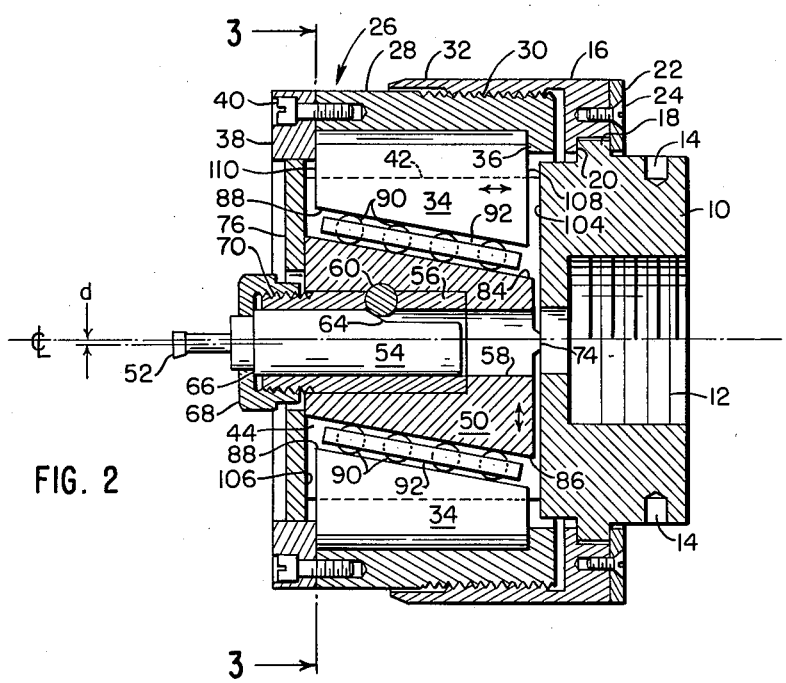
FIG. 2 is a cross-section in side elevation, taken along line 2—2 in FIG. 1, looking in the direction of the arrows.

The tool slide is formed with parallel planar cam surfaces 84 and 86 (FIG. 2), such that a cross-section on the diametral plane of the slideway substantially forms a parallelogram. The cam portions 34 are formed with parallel planar cam surfaces 88, the cam portions being axially reversed with respect to one another so that these surfaces lie in parallel relation to the cam surfaces 84 and 86. While the cam surfaces of the cam portions and the tool slide may directly engage in slidable relation if desired, I prefer to interpose a plurality of balls 90 in interference-fitted relation between these surfaces. The preloaded balls minimize play between the parts, while reducing frictional reaction to adjustment of the head. Plate-like retainers 92 are provided to maintain the spaced relationship between the balls.

I prefer also to provide a plurality of balls 94 (FIGS. 3 and 4) interposed in press-fitted relation between the inner periphery of the cam-mounting ring 28 and the outer arcuate surfaces of the bifurcated portions 42. Arcuate cylindrical retainers 96 are provided to maintain the spaced relationship of the balls 94.

Figure 4:
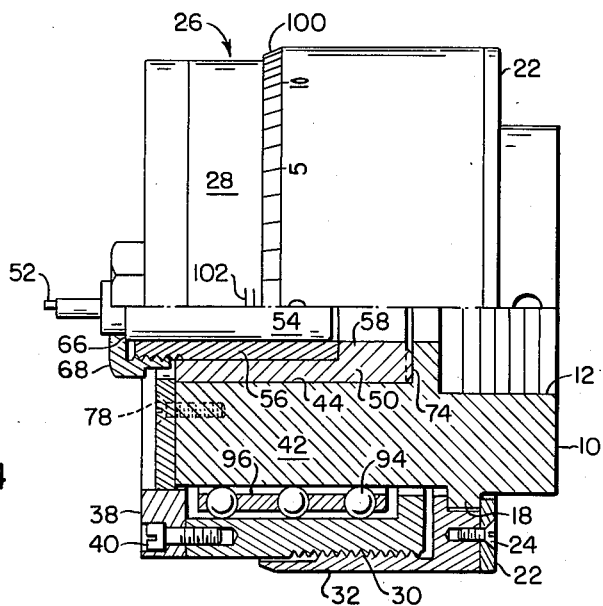
FIG. 4 is a cross-sectional view taken along line 4—4 in FIG. 3, looking in the direction of the arrows.

To adjust the radial position of the tool 52 with respect to the principal axis, an operator merely rotates the adjustment barrel 16, and gages the amount of adjustment by means of micrometer calibrations 100 on the adjustment barrel and 102 on the cam member (FIG. 4). This movement actuates the cam member 26 axially to adjust the position of the tool 52 and tool slide 50 along the diametral plane of the slideway, i.e. radially of the axis. An intermediate adjusted position is shown in the drawings, in which the axis of the tool holder is shown offset from the principal axis of the body by a dimension $d$. The limits of the range of adjustment are established by the axial spacing between a radial end wall 104 of the slideway 44, and the interior radial surface 106 of the slide-retaining plate 76, one of which abuts the corresponding surface 108 or 110 of the cam members 34 at the opposite extreme limits of the adjusting movement.

It will be apparent from the foregoing description that the improved adjusting head affords precise positioning with a minimum of frictional resistance to manual adjustment, and yet has very little inherent inaccuracy due to looseness of the driving connections between the parts. The improved head may readily be adapted for the adjustment of slides or other adjustable parts of machine tools, as well as cutting tools. Various changes and modifications will readily occur to those skilled in the art without departing from the true spirit and scope of the invention, which I intend to define in the appended claims.

What I claim is:

1. For use in a machine tool, means for adjusting the position of a part, comprising, in combination: a body adapted to be mounted on a machine tool, a cam member comprising a ring circumferentially spaced about said body and a pair of cam portions extending inwardly within said ring, a slide adapted to be drivingly connected with a part of the machine tool to be adjusted, an adjustment barrel circumferentially spaced about said body and mounted for rotation thereon, said barrel being threadedly engaged with said ring for adjusting movement of said cam portions parallel to a rectilinear axis lying in a plane, said body including a pair of spaced parallel walls forming a slideway slidably receiving said cam portions in diametrically-opposed relation with respect to said axis, said slide being confined in said slideway between said walls and said cam portions for sliding motion parallel to said plane, said head having means confining said slide to rectilinear motion normal to said axis, said cam portion and said slide being formed with confronting cam surfaces, and a plurality of ball bearings interposed between said confronting cam surfaces with a press-fit to drivingly connect said cam member with said slide for adjustment of the position of said slide in response to rotary movement of said barrel.

2. For use in a machine tool, means for adjusting the relative position of a part thereof, comprising, in combination; a cylindrical body adapted to be mounted on a machine tool, said body having bifurcated portions formed by a rectilinear slideway having walls extending parallel to a plane diametral to a principal axis of the body, a cam member comprising a ring circumferentially spaced about said bifurcated portions and a pair of cam portions extending internally of said ring and diametrically opposed with respect to said axis, said cam portions received in said slideway for sliding movement parallel to said plane, an annular adjustment barrel mounted on said body for rotation about said axis by means constraining said barrel against relative axial movement, said barrel threadedly engaged with said cam member for axial movement thereof, a tool slide adapted to be drivingly connected with a part of the machine tool to be adjusted, said slide being confined in said slideway between said cam portions and said slideway walls for sliding movement parallel to said plane, said body having means confining said slide to movement normal to said axis, said cam portions being formed with confronting parallel planar cam surfaces, said slide being formed with planar cam surfaces each parallel to and confronting a corresponding one of said cam surfaces of said cam portions, and a plurality of ball bearings interposed between said confronting cam surfaces with a press-fit to drivingly connect said cam member with said slide for rectilinear adjusting movement of said slide in response to rotational movement of said barrel.

3. The combination recited in claim 2, together with a plurality of further ball bearings circumferentially interposed between an interior surface of said ring and an exterior surface of said bifurcated portions with a press-fit to support said cam member for axial movement with respect to said body.

References Cited in the file of this patent

UNITED STATES PATENTS

| 2,433,976 | Babka | Jan. 6, 1948 |
| 2,490,397 | Aked | Dec. 6, 1949 |

FOREIGN PATENTS

| 263,723 | Switzerland | Dec. 1, 1949 |
| 1,038,110 | France | May 6, 1953 |